(No Model.)
J. CHRISTIFF.
THILL COUPLING.
No. 357,761.  Patented Feb. 15, 1887.
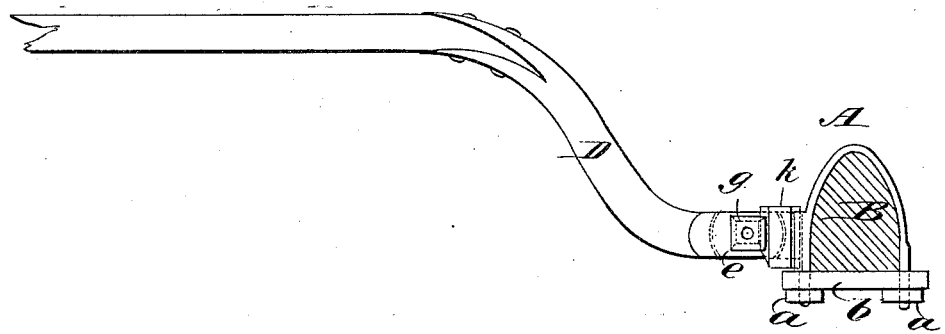
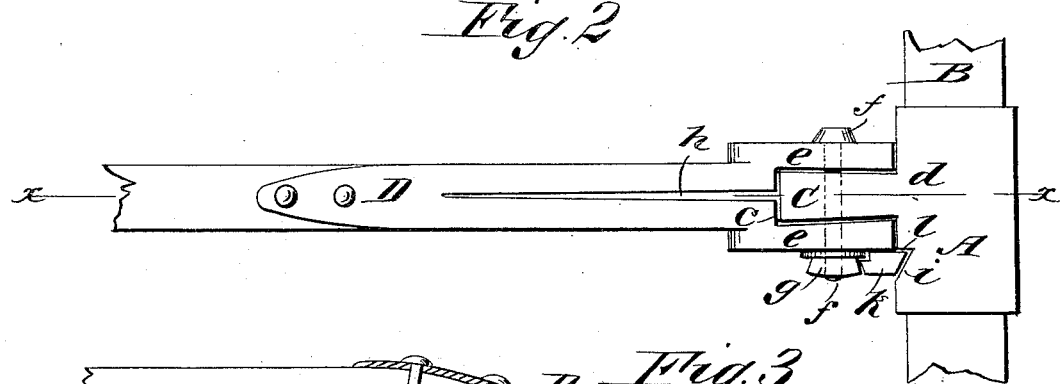
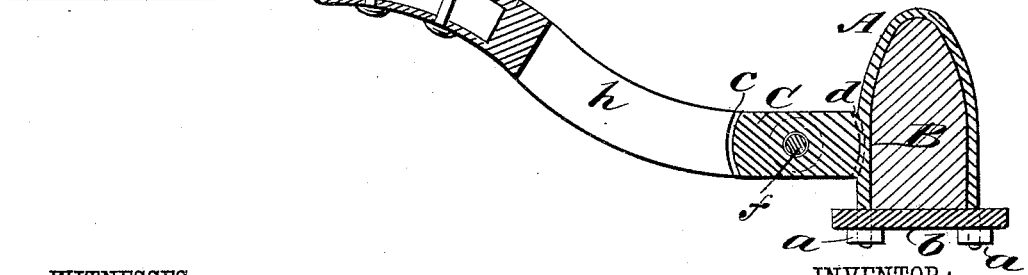
WITNESSES:
F. McArdle
C. Sedgwick
INVENTOR:
J. Christiff
BY Munn & Co
ATTORNEYS.

UNITED STATES PATENT OFFICE.

JOSEPH CHRISTIFF, OF HIGHTSTOWN, NEW JERSEY.

THILL-COUPLING.

SPECIFICATION forming part of Letters Patent No. 357,761, dated February 15, 1887.

Application filed October 20, 1885. Serial No. 180,428. (No model.)

*To all whom it may concern:*

Be it known that I, JOSEPH CHRISTIFF, of Hightstown, in the county of Mercer and State of New Jersey, have invented a new and Improved Thill-Coupling, of which the following is a full, clear, and exact description.

My invention relates to the construction of that class of devices by which the thills or shafts of vehicles are connected to the forward axle.

The object of the invention is to prevent the rattling of the shaft or thill coupling; and to this end the invention consists of certain novel constructions, which are illustrated in the drawings and will be hereinafter explained, and specifically pointed out in the claims.

Reference is to be had to the accompanying drawings, forming a part of this specification, in which similar letters of reference indicate corresponding parts in all the figures.

Figure 1 is a side view of my improved coupling, the axle being shown in section. Fig. 2 is a plan view, and Fig. 3 is a longitudinal sectional view taken on line $x\ x$ of Fig. 2.

The clip A is secured about the axle B, in the ordinary manner, by nuts $a\ a$, a clip-block, $b$, being interposed, as shown.

The clip A is formed with a lug, C, which is preferably wedge-shaped, being wider at its projecting end $c$ than at its base $d$. The shaft-iron D is formed with two eye-irons, $e\ e$, spaced and formed so as to fit close against the sides of the lug C, to which they are secured by the pivot-bolt $f$, which in turn is held by the nut $g$, formed with beveled faces, as shown. A kerf or wedge-shaped cut, $h$, is formed in the shaft-iron, so that by tightening the nut $g$ the eye-irons $e\ e$ will be brought close up against the sides of the lug C, thereby preventing all rattling of the parts, and as the parts loosen from wear they may be tightened by simply still further turning the nut $g$. To hold the nut in place I provide a wedge, $k$, which fits against the face of the nut nearest to the clip A, and against the beveled surface $i$ of a notch, $l$, formed in the clip, as shown. The direction of the thread on the bolt $f$ is such that when the shafts are raised the bolt will turn within the nut, which is held by the wedge $k$, thereby slightly loosening the nut and facilitating the movement of the shafts, which are, as shown, fitted in sockets formed at the ends of the irons D.

The wedge $k$ is not essential, but its use is preferred, as with it there is less wear on the bolt when it passes through the lugs of the coupling.

I am aware that a nut-lock for railroad fish-plates has been formed of a flat plate bent back on itself at one end, a wedge being placed in said bent-over portion and bearing at one edge on one edge of an ordinary nut, the bolt of which extends through an aperture in the plate. The opposite end of the plate had a notch and a square aperture to receive and lock the nuts at end of the adjacent rail. The inner face of the bent-over end of the flat plate was provided with a pin that entered an aperture in the fish-plate. I am also aware that a nut-lock has been formed of a plate having vertical shoulders at each end that rested against the flat faces of two ordinary nuts, and I do not claim any such constructions as of my invention.

Having thus fully described my invention, I claim as new and desire to secure by Letters Patent—

1. The combination, with the thill-iron, the clip, and a bolt connecting the clip and the thill-iron between the ends of said clip, of the nut having inward beveled sides, and a wedge having one vertical edge beveled to engage the beveled nut and bearing against the clip with its opposite vertical edge, substantially as set forth.

2. The combination, with the thill-iron D, having a vertical-inclined notch, $l\ i$, the clip, and the bolt connecting the two, of the nut $g$, having inward beveled sides, and the wedge $k$, having the vertical edges beveled to engage a beveled side of the nut, and the notch $l\ i$, substantially as set forth.

JOSEPH CHRISTIFF.

Witnesses:
D. H. CUNNINGHAM,
EDWARD TAYLOR CUNNINGHAM, Jr.